United States Patent [19]

Charbonneau et al.

[11] Patent Number: 4,860,596

[45] Date of Patent: * Aug. 29, 1989

[54] MOTOR OPERATED VALVE ANALYSIS AND TESTING SYSTEM WITH MONITORING OF SPRING PACK MOVEMENT THROUGH TORQUE SWITCH POST

[75] Inventors: Arthur G. Charbonneau; John A. McMennamy, both of Marietta; Steven Nafziger, Gwinnett, all of Ga.

[73] Assignee: NSS of Delaware, Inc., Campbelltown, Pa.

[*] Notice: The portion of the term of this patent subsequent to Apr. 5, 2005 has been disclaimed.

[21] Appl. No.: 66,721

[22] Filed: Jun. 25, 1987

Related U.S. Application Data

[63] Continuation of Ser. No. 816,749, Jan. 7, 1986, Pat. No. 4,735,101.

[51] Int. Cl.⁴ .................. G01M 19/00; G01P 13/00; G01L 5/00
[52] U.S. Cl. .................................. 73/862.32; 73/168
[58] Field of Search ............... 73/168, 862.19, 862.27, 73/862.31, 862.32; 137/551, 552; 251/129.03

[56] References Cited

U.S. PATENT DOCUMENTS

| | | | |
|---|---|---|---|
| 3,946,985 | 3/1976 | Fujita et al. | 251/129.03 |
| 4,542,649 | 9/1985 | Charbonneau et al. | 73/862.27 X |
| 4,570,903 | 2/1986 | Crass | 73/862.31 X |
| 4,660,416 | 4/1987 | Charbonneau et al. | 73/168 |
| 4,690,003 | 9/1987 | McNennamy et al. | 73/168 X |
| 4,693,113 | 9/1987 | McNennamy et al. | 73/168 |
| 4,712,071 | 12/1987 | Charbonneau et al. | 73/168 X |
| 4,735,101 | 4/1988 | Charbonneau et al. | 73/862.27 X |
| 4,759,224 | 7/1988 | Charbonneau et al. | 73/862.27 |
| 4,787,245 | 11/1988 | Anderson et al. | 73/168 |
| 4,805,451 | 2/1989 | Leon | 73/862.31 X |

FOREIGN PATENT DOCUMENTS

173182  9/1965  U.S.S.R. ................. 73/168

Primary Examiner—Tom Noland
Attorney, Agent, or Firm—Louis T. Isaf

[57] ABSTRACT

A unique apparatus and method are used to detect and measure movement of a valve spring pack and worm through monitoring rotation of the torque switch control post. A device for measuring the operating characteristics of a valve and its operator and the corresponding imposed valve stem load is attached to the valve operator. The apparatus provides devices for statically calibrating the operator relative to the imposed valve load and provides a device for recording traces of the improved load and associated parameters during dynamic conditions as related to the operation of the operator and valve combined. The apparatus is then used to provide diagnostic dynamic traces at any specified time in the future for the operator and valve. These future traces are used to compare with earlier traces to verify correct performance and most importantly to detect induced or impending damage, malfunctions, or maintenance requirements for the operator and valve.

2 Claims, 4 Drawing Sheets

OUTPUTS
A = Stem load
B = Spring pack device
C = Motor current
D = Switch position

FIG. 8

MOTOR OPERATED VALVE ANALYSIS AND TESTING SYSTEM WITH MONITORING OF SPRING PACK MOVEMENT THROUGH TORQUE SWITCH POST

This application is a continuation of application Ser. No. 816,749, filed Jan. 7, 1986 and now U.S. Pat. No. 4,735,101.

FIELD OF THE INVENTION

This invention generally relates to a system by which the overall performance and actual thrust loads delivered by an electromechanical, mechanical, pneumatic or hydraulic valve operator can be statically and dynamically monitored. Special emphasis is placed on new apparatus and methods for monitoring spring pack movement by monitoring movement of an existing torque switch control post.

BACKGROUND OF THE INVENTION

The conditions giving rise to the problems solved by this invention are commonly found in industries utilizing externally driven valves. In particular within the power industry, valves are operated remotely from open, closed and intermediate positions to improve or maintain utility power plant output, or in many cases provide for the protection of the general public from release of radioactive materials either directly or indirectly. Continual proper operation of these valves is essential to industries and the general public.

Typically these valves are required to operate under differing operation conditions of temperature, pressure and flow within the common requirement for consistent operation. Further, the inherent operating characteristics of the valve and operator are constantly undergoing mechanical or electrical changes from maintenance, repair, adjustments, calibration and wear.

In the earlier state-of-the-art, remote and local externally operated valves have been tested and calibrated to demonstrate that the operator will deliver the minimum or maximum thrust loads to the valve stem under static conditions. The prior state-of-the-art did not provide verification that the static load delivered by the operator was acceptable after field assembly or maintenance, nor did the prior art provide any verification of the imposed valve load under dynamic conditions.

Historically, the thrust required to open or shut and subsequently to seat a valve was determined analytically by considering such factors as temperature, pressure, pressure drop, flow, liquid, valve type, packing load, motor voltage and valve mechanical characteristics. Once the minimum and maximum valve thrust requirements were determined analytically, the valve operator size could then be selected. Normally, motor operated valves in nuclear power plants, which perform a safety function, are required to operate between seventy-five and one hundred-ten percent (75–110%) of nominal line voltage applied to the operator. This requirement could lead to sizing of operator motors which can deliver from 1.0 to 2.5 times the required valve stem thrust, depending upon the actual line voltage. With oversized motors and operators, the load imposed on the valve is typically much larger than anticipated or estimated by static means, due to the inherent motor/operator inertia effects. Prior state-of-the-art methods are minimizing the effects of dynamic or inertia forces involved the use of torque switches, motor brakes or compensating springs. Although these devices provided some relief, they do not preclude excessive or inadequate thrust loads being delivered to the valve stem, seat and body. Complicating this situation is the fact than when a valve leaks, common practice has been to increase the force delivered to the valve stem through increased torque switch adjustments. Studies have shown that this approach subsequently leads in many cases to irrevocable damage to the valve or inoperativeness and more importantly degradation of system reliability as a whole.

The basic shortcoming of the prior art-load limiting devices is that they are not diagnostic on nature and, as in the case of the torque switch, provide an element of protection which does not take into account the dynamic considerations of the valve and operator during actual operation. Changing effects on valve load under dynamic conditions such as line voltage, packing tightness, gear train wear, lubrication degradation, calibration, and adjustment errors cannot be identified with the earlier state of the art devices. Further, in most cases, prior state of the art post-maintenance valve and operator actuation testing will not identify progressive degradation of valve performance.

SUMMARY OF THE INVENTION

Briefly described, the present invention comprises a modification to the prior state of the art, which includes the addition of a device(s) which will measure motion of the operator drive system continuously and provide a dynamic trace of the actual load being delivered to the valve throughout the operation cycle. After initial calibration, the recorded trace will provide accurate information upon which more accurate and appropriate load limiting device adjustments can be made. In doing so, increased system reliability and reduced probability of physical valve damage can be obtained. This improvement over the state-of-the-art also provides a means to determine, monitor and test valve and operator performance throughout its cycle, from open to closed positions and vice versa. Information on valve performance, which heretofore, was unavailable from the previous state-of-the-art protection devices, will provide a direct indication of developing valve and operator problems such as excessive or inadequate packing load, excessive inertia, proximity to premature tripping, incorrectly set operating limit and torque switches, improperly functioning thermal overload devices, inadequate or excessive stem thrust loads, gear train wear, stem damage, and load relaxation. All of the above forms of valve and/or operator degradation will be apparent from data records obtained from load, current, and continuity devices, which form part of the total analysis and testing hardware of the invention, described in more detail to follow. Knowledge of the above actual or pending problems will enable the user to take necessary corrective action prior to actual failure of the valve to perform its intended function. Early corrective action can, therefore, lead to improved system reliability, improved safety, lower maintenance and repair costs.

The user of the present invention will have the capability of testing and monitoring the valve and operator performance remotely, which will reduce personnel radiation exposures in nuclear power plants. Furthermore, the present invention will be of great value to other industry applications such as chemical or hazardous material environments or even to those applications where accessibility to those components is restricted.

The purpose of the present invention, when taken as a whole, is to provide a method by which the general material and operational condition of a valve and its associated operator can be determined and evaluated.

The present invention includes a spring pack movement monitoring device which monitors worm movement (and related spring pack movement) by unique attachment to and monitoring of the valve operator torque switch control post.

One object of the present invention is to provide an actual dynamic valve operator spring pack movement-time trace, through monitoring movement of the torque switch control post.

Another object of the invention is to correlate valve stem load to spring pack movement (defined from control post movement), and therefore provide a valve stem load-time trace.

Another objective of the invention is to provide an operator motor current-time trace that can be correlated with the valve stem load trace.

Another object of the invention is to provide a torque and limit switch on/off-time trace that can be correlated with the valve stem load and motor current traces.

According to one aspect of the invention there is a diagnostic interrelationship between the calibrated valve stem load-time trace, the motor current-time trace, and the torque and limit switch position-time trace.

According to another aspect of the invention the interrelationship of the stem load-time trace, motor current-time trace, and the torque and limit switch position-time trace can be used to verify correct valve stem loads for initial valve and operator installations, or future operational testing of the valve and operator.

The present invention includes a specially designed spring pack movement device to facilitate mounting of the device to the torque switch control post to allow installation and operation of the device in operators where direct access to the spring pack is difficult or otherwise undesired.

A DESCRIPTION OF THE PREFERRED EMBODIMENT

Figure 1:
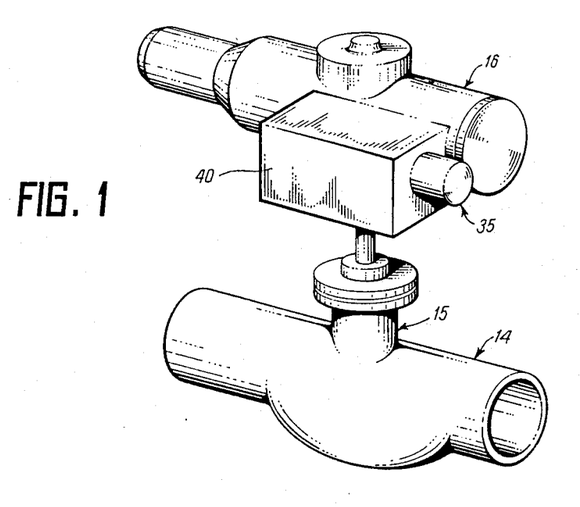
FIG. 1: A pictoral, partial view of one embodiment of a valve, valve operator, and piping system in accordance with the present invention.

Referring now in greater detail to the drawings, in which like numerals represent like components through the different views, FIG. 1 shows the environment in which the preferred embodiment of the invention is used. A process pipe 14, having a valve 15, with an attached operator 16 is within an operating system with a prescribed flow, pressure, and temperature. The valve 15 is opened or closed as required for system control, and is opened or closed by the operator 16. The operator 15 can be electromechanical, mechanical, pneumatic, or hydraulic. A control circuitry box 40 is shown.

Figure 2:
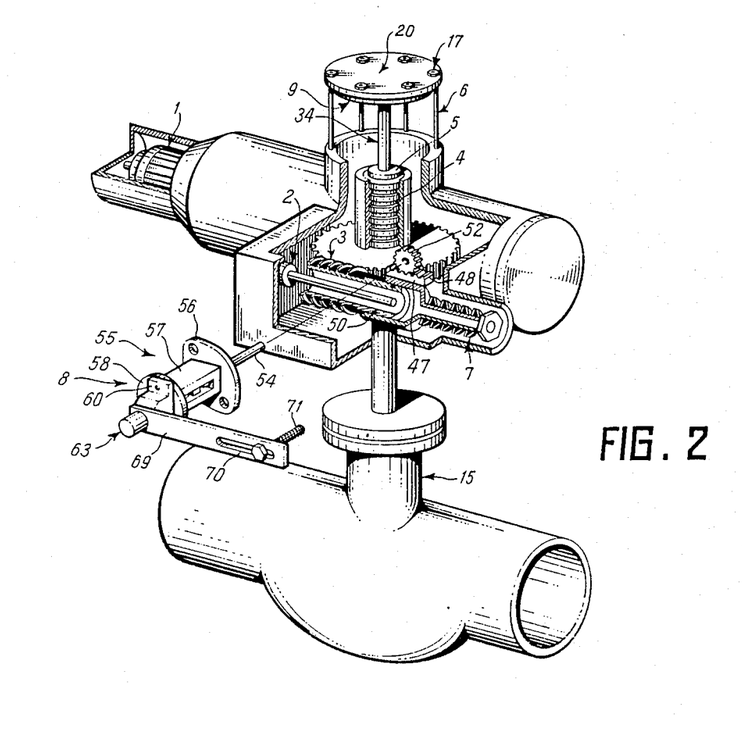
FIG. 2: A cut-away view of a valve analysis and testing system, showing the valve operator of FIG. 1, with the attached stem load calibration device and spring pack movement monitoring device in accordance with the present invention.
Figure 3:
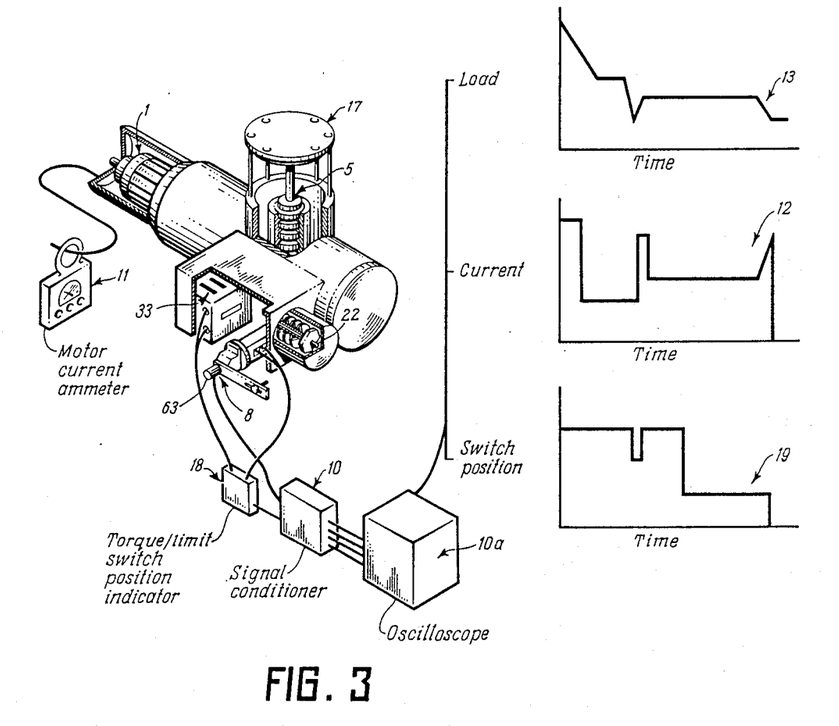
FIG. 3: A schematic representation of a valve analysis and testing system in accordance with the present invention, showing a valve operator with attached diagnostic devices, recording device, and recorded function-time parameters.

FIG. 2 shows a partial cut-away view of an operator 16, used in the present invention. The operator 16, is similar to operator and valve stem arrangements typically used in the art. The motor 1 drives a worm shaft 2, which in turn drives a worm 3, which in turn drives a worm gear 4, which in turn drives the valve stem 5, to open or close the valve 15. In order to absorb some of the rotating inertia of the motor and other operator components, a cluster of compression springs or spring pack 7 is provided at one end of the worm shaft 2, as shown in FIGS. 2 and 3. When the valve 15 closes or opens, the valve stem 5 will abruptly stop and even though the current to the motor 1 is interrupted, the rotational and kinetic energy of the system will cause the worm gear 4 to induce additional loads on the valve stem 5. In order to absorb some of this energy, the spring pack 7 is provided and is compressed by the worm shaft 2 as the inertia of the system attempts to move the valve stem 5.

A toothed rack 47 is shown attached to the worm 3 for axial movement with the worm along worm shaft 2. The teeth 48 of rack 47 are formed in a rack body which is mounted to the worm 3 by a bearing connection 50. The bearing connection 50 is such that the rack 47 and toothed portion 48 do not rotate with the worm 3 but only move axially with the worm. The rack 47, as it moves back or forth with the worm 3, drives a spur gear 52 which is mounted so as to be limited to rotational movement, as known in the industry. The spur gear 52 is mounted to a bar or post 54 which post protrudes into the control box 40 where a torque switch assembly 55 is mounted to the post. The torque switch assembly 55 is of a type typical in the industry and generally includes a rear mounting plate 56 for attaching the assembly to the operator wall, a switch chamber 57 which houses the mechanical/electrical torque switches 32,33, a face plate 58, and switch setting screws at the face plate.

FIG. 2 shows a stem load calibration device 17, and a spring pack movement device 8, which are used to calibrate the spring pack movement (i.e.. axial movement of the worm) relative to the imposed load on the valve stem 5. This calibration and correlation is accomplished by a simultaneous inducement of a load into the operator through the worm shaft 2, and tracing the actual stem 5 load and spring pack 7 movement through the use of a calibrated load cell 9 and rotational movement detecting device.

SPRING PACK MOVEMENT MONITORING DEVICE 8

Figure 4:
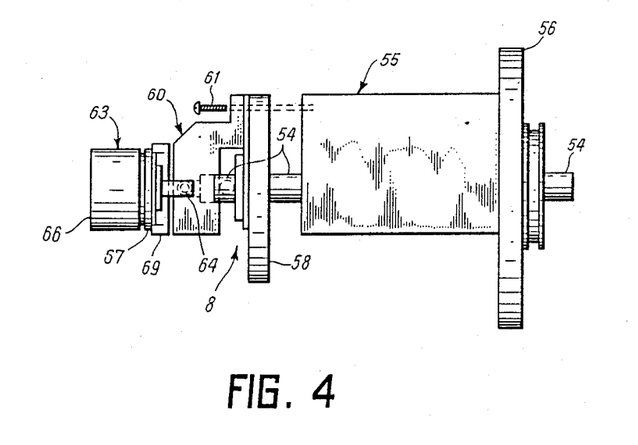
FIG. 4: A side view, of the spring pack movement monitoring device, and related components, in accordance with the present invention.
Figure 5:
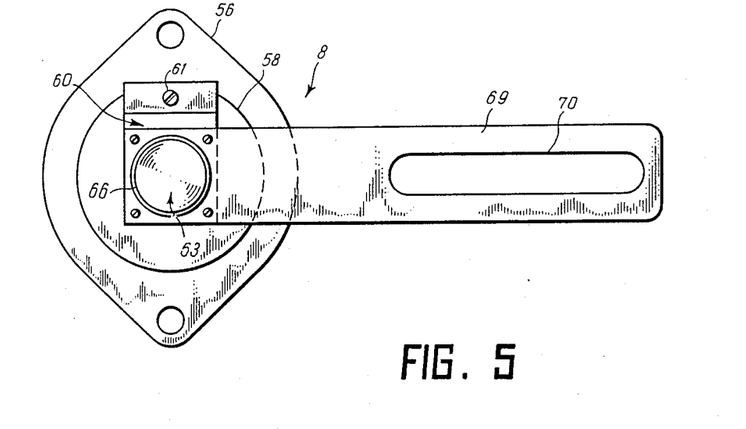
FIG. 5: A frontal view, of the spring pack movement monitoring device, and related components, in accordance with the present invention.

The Spring Pack Movement Monitoring Device 8 is shown in detail in FIGS. 4 and 5. The function of this spring pack movement monitoring device 8 is to monitor, both statically and dynamically, the linear (axial) motion of the operator's spring pack 7. Monitoring of the spring pack 7 motion, in the preferred embodiment of this invention, is accomplished through monitor and measurement of the torque switch control post 54. The control post 54 is rotated about its elongated axis by the gear interaction of spur gear 52 and toothed rack 47. The gear interaction, and thus rotation of the control post 54 is effective by movement, in an axial direction (along the worm shaft 2), of the worm 3. The axial movement of the worm 3 is directly affected by the characteristics of the spring pack, such as spring coefficient and compressibility, etc. Therefore, movement of the worm 3, and thus movement of the rack 47, and thus rotation of the control post 54 is directly related to the spring pack movement. The device of the present invention which monitors rotation of the control post 54, combined with the associated analysis and correlation devices, shall be termed a spring pack movement monitoring device; the output data of this spring pack movement monitoring device 8 being directly related to data acquired by direct monitoring of the spring pack 7 itself. The exact relationship between control post 54 rotation and actual movement of the spring pack 7 varies for different spring packs and different gear ratios and is separately determined by testing once the spring pack and gear specifications are set.

FIGS. 4 and 5 show the significant components and operation of the spring pack movement monitoring device 8. With reference to FIGS. 1, 2, 3, 4 and 5, the spring pack movement device 8 comprises an adapter 60 which fits over the control post 54 (or an extension thereof) as it protrudes from the torque switch assembly 55 beyond face plate 58. The adapter 60 is connected to the face plate 58 by a screw 61 which is a normal, preexisting component of the face plate. In the preferred embodiment, a radial variable differential transducer ("RVDT") 63 is connected to the adapter 60 by an extention bar 64. The extention bar 64 is oriented such that the elongated axis of the extention bar and the elongated axis of the control post 54 are colinear. The extention bar is pinned to the adapter 60. The RVDT 63 comprises two major portions which shall be termed the core 66 and the base 67. The extention bar 64 is an extention of core 66 and the core/extention bar element 66/64 rotates relative to the base 67 and independently of the base. A mounting arm 69 is attached in a fixed manner to the base 67 of RVDT 63. When the spring pack movement monitoring device 8 is in use, the mounting arm 69 is bolted for rigid, non-movement, to the operator body. In the preferred embodiment, the control box 40 is removed during use of the spring pack movement monitoring device 8, and the mounting arm 69 is bolted to the bolt holes from which the control box 40 was removed. The mounting arm 69 is shown with an elongated slot 70 which is for adjustment purpose. When the mounting arm 69 is bolted in place, it does not slide along this slot, but rather, is maintained stationary.

In operation, the face plate 58 of torque switch assembly 55 is typically pinned to the control post 54 (or its extention) for direct rotation with the control post. Under the present invention, the adapter 60 by virtue of its attachment through screw 61, rotates with the face plate 58. As the adapter 60 rotates, the extention bar 64, which is pinned to the adapter and coaxial with the control post 54, is also rotated. Rotation of the extention bar 64 result in rotation of the RVDT core 66 to which the extention is connected. The RVDT base 67, being fixed to the mounting arm 69 which arm is itself rigidly mounted, does not rotate. Thus, the RVDT core 66 rotates relative to the base 67 when the control post 54 is rotated by movement of the worm 3 (compression of the spring pack 7). The relative rotation of the RVDT 63 components is detected at signal conditioner 10. Thus, the spring pack 7 movement, translated to the control post 54 rotation, is traced electronically and this movement is displayed on an analytical device such as an oscilloscope 10a (FIG. 3), hereinafter generally known as the recorder.

Figure 8:
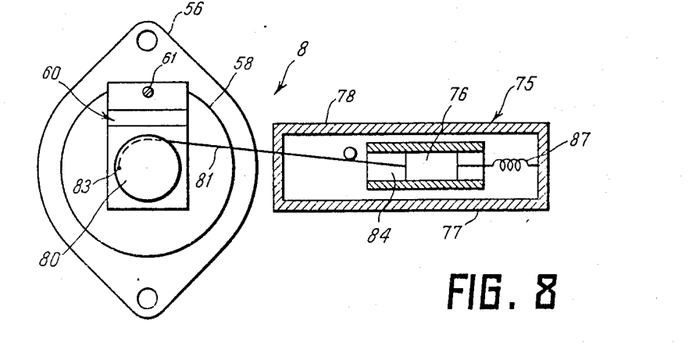
FIG. 8: A frontal view depicting an alternate embodiment of the spring pack movement monitoring device.

An alternate embodiment of the torque switch control mounted spring pack movement monitoring device 8 is shown in FIG. 8. In this alternate embodiment rotation of the control post 54 is again detected and recorded as representative of the spring pack compression. Instead of using a radial variable differential transducer (RVDT) 63, the alternate embodiment makes use of a linear variable differential transducer (LVDT) 75. The LVDT 75 comprises a core 76 moveable through a bracket 77 which is mounted in a casing 78. In this embodiment, a grooved wheel (spool) 80 is mounted on the extension bar 64 for rotation with the adapter 60 and thus with the control post 54. A wire element 81 is tied at one of its ends 84 to the spool 80 at point 83. The other end of the wire 81 is attached to the LVDT core 76. A spring 87 is connected to the LVDT core 76 opposite the wire element 81. In the neutral state, the LVDT core 76 is located approximately midway through its stroke in the bracket 77 and the spring is pulled in tension. Thus, as the control post 54 rotates in a counterclockwise direction, the wire element 81 is wound about the spool 80, pulling on the LVDT core 76. As the control post 54 rotates in the clockwise direction, the wire element 81 is unwound from the spool 80, lessening the tension of the spring 87, which spring pulls on the LVDT core 76 in the other direction. Movement of the core 76 through the bracket 77 is detected in the manner known in the art. As with the prior embodiment, control post 54 movement and thus spring pack movement is traced electronically, and this movement is displayed on the recorder 10a.

STEM LOAD CALIBRATION DEVICE-17

The purpose of the Stem Load Calibration Device 17 is to initially correlate the movement of the spring pack 7 to the actual load being delivered to a valve stem 5. Stem load can be calibrated to linear displacement of the spring pack 7 since one is merely a reaction to the other. The calibration device 17 is a structure, preferably of steel, comprised of multiple support rods 6 and a drilled flat circular plate 20. On the underside of the plate is fastened a calibrated load cell 9, which is a well known device in the state-of-the-art. The calibration device 17 sits above the valve operator body 16. When the extension shaft 34 is then placed between the lower surface of the load cell 9 and the upper valve stem 5 surface, a load can be induced on the stem 5 by input torque via the worm shaft 2.

CHANNEL SELECTOR AND SIGNAL CONDITIONER DEVICE-10

The purpose of the Channel Selector and Signal Conditioner Device 10 is as follows: (Refer to FIG. 3.)
1. Provide a conditioned power supply for the RVDT of the spring pack movement monitoring device 8, for load cell 9 and torque/limit switch position indicating device 18.
2. House the electronic circuitry (see FIG. 6) for the detection of the limit and torque switch position. This circuit will be discussed in more detail to follow.
3. Provide the necessary sub-components for switching capabilities to enable the user to output any of the following signals to the data collection system: control post rotation, related spring pack movement, load cell, motor current, and torque/limit control circuit switch position.
4. Provide input and output connections for an external motor current measuring device 11.
5. Provide local digital readout capabilities for the load cell 9 and spring pack movement monitoring device 8.
6. Provide a load cell 9 calibration circuit and output signal for verifying proper operation of the recording device 10a.

LIMIT/TORQUE SWITCH POSITION DEVICE-18

Figure 6:
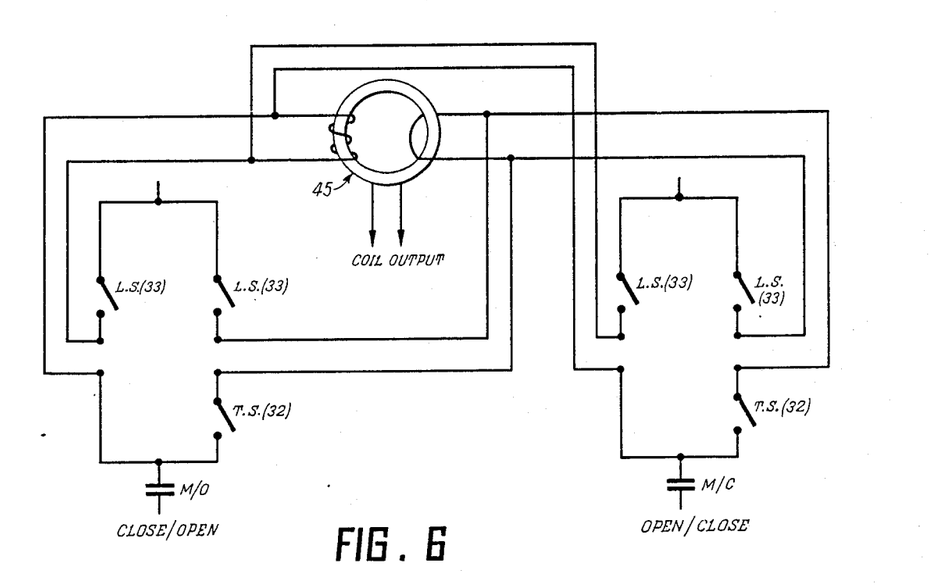
FIG. 6: An electrical schematic showing the design of the switch position indicating circuity and sub-components, in accordance with the present invention.
Figure 6A:
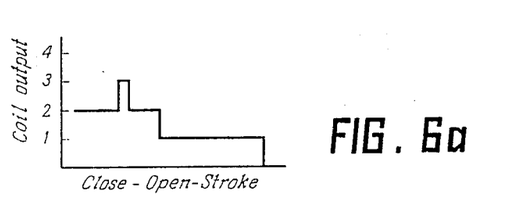
FIG. 6A: A sample trace from the magnetic coil of the limit/torque switch position device, in accordance with the present invention.

The limit/torque switch position device 18 comprises a sensing circuit and associated electronics which are housed in the Channel Selector and Conditioning Device 10. As can be seen from the electrical schematic diagram, FIG. 6, the circuit will provide a varying output to the recording device 10a depending on which of the switches (Limit 33, or Torque 32) are closed or opened. It should be noted that if valve 15 is being operated, only one of the contacts identified as M/C or M/O (FIG. 6) will be closed, depending on whether the valve is opened or closed. A sample trace from the magnetic coil 45 is shown in FIG. 6A for ease of understanding. Note that the variable output shown in the sample trace is obtained by looping the signal wire from one side of the parallel control circuit around the magnetic coil more times than the signal wire from the other parallel path. The result of this embodiment of the invention is an output to the recording device 10a, whose magnitude is reflective of which of the two parallel paths, or both, has its associated switches opened or closed.

CURRENT MEASURING DEVICE-11

The Current Measuring Device 11 is used to monitor the current draw of the valve operator motor 1 during the operation of the valve 15. The power required to operate valve 15 can be directly correlated to the actual delivered stem thrust of the operator 16, and thus, corresponding traces (curves) for the stem load 13 and motor current 12 will be obtained. By initial comparison of the two curves 12 and 13, the user can subsequently obtain either one of the signature traces 12 or 13, and have sufficient information on the performance of the valve/operator assembly. The desirability of the current signature trace 12 lies in the fact that it is generally easier to obtain than the stem load curve 13. The component which is preferably used to obtain the motor current trace 12 is a clamp-on Ampmeter 11 which is well known to those familiar with the state-of-the-art.

The signal output of the motor current measuring device 11 is sent to the Channel Selector and Conditioning Device 10 which has been described previously.

RECORDER-10a

The Recorder 10a is intended to acquire and store the input data for subsequent display on a screen, or hardcopy printer, for anaylsis and/or record purposes. Typical recording devices 10a used for the above purposes are well known to those familiar with the state-of-the-art.

In the interrelationship of the above described components of the preferred embodiment of the valve analysis and testing system of the present invention is shown in FIG. 3.

Figure 7:
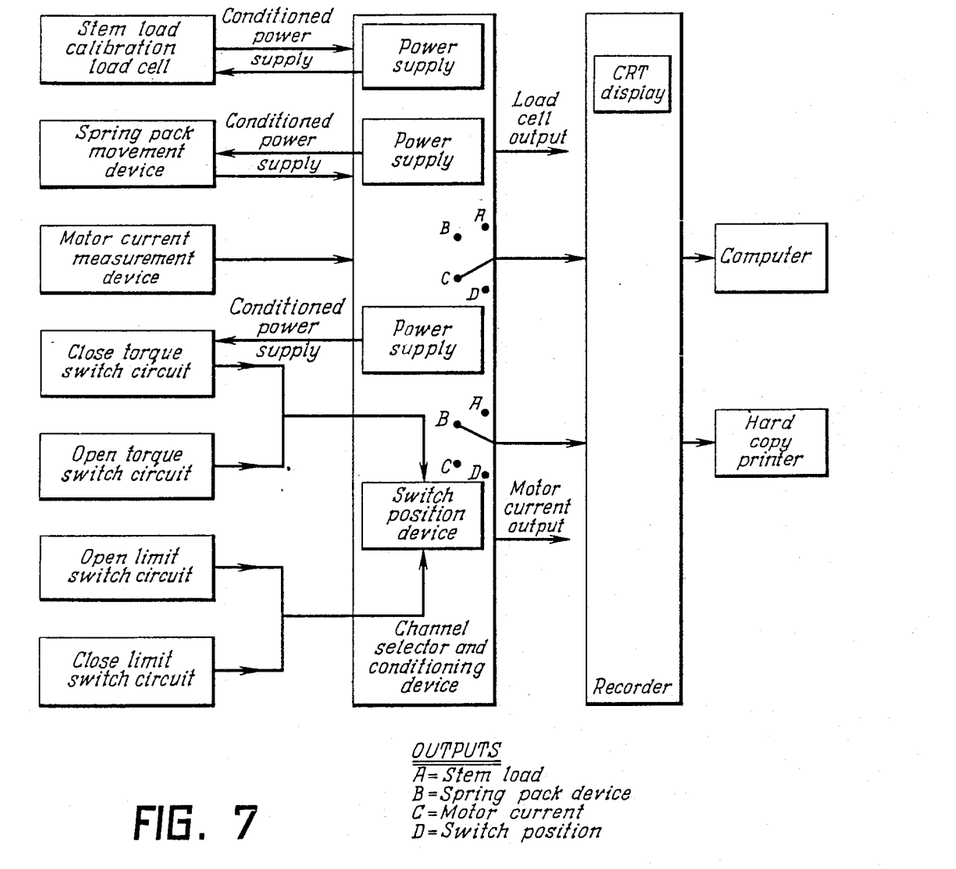
FIG. 7: An electrical block diagram showing how the system signals are obtained and processed, in accordance with the present invention.

An electrical block diagram of the invention is provided as FIG. 7, to show how the electical signals are obtained and processed by each of the component parts, also, referred to as component sub-systems.

Referring to FIG. 3 and having established the relationship between valve stem 5 load, torque switch control post 54 rotation and spring pack 7 movement, and connecting the spring pack movement measuring device 8 to the channel selector and conditioning device 10, the control post 54 rotation (which is related to spring pack 7 movement and is indicative of actual stem load) as a function of time can be recorded as a stem load trace 13 for any operation cycle of the valve. In addition, the motor current measuring device 11 is given to provide a current trace 12, and can be correlated to the stem load trace 13 for further operator and valve performance evaluation, as defined later.

As seen in FIGS. 3 and 4, the valve operator 16 includes a torque switch 22 and limit switch 33 (located within the indicated housing, 40, but not seen here), which are connected and function in a manner known in the art. A torque/limit switch position indication device 18 is electrically wired into the torque switch 32 and limit switch 33 control circuit, as shown in FIG. 6. The output from the torque/limit switch position device 18 is connected to the recording device 10a, via the channel selector and conditioning device 10, which in turn provides a switch on-off-time trace 19, also called torque/limit switch position-time trace 19, for the duration of the operator cycle.

When the spring pack movement measuring device 8, motor current measuring device 11, and the torque/limit switch position indication device 18 are activated simultaneously and recordings of each, with reference to the same operator cycle-time, are obtained, the relationship of the recordings provide diagnostic data. To be more specific, since the control post 54 rotation (thus spring pack 7 movement) is calibrated to the valve stem 5 load, the Control post rotation trace (spring pack movement trace) is a direct dynamic stem load-time relationship for an operator cycle. Thus, the control post rotation trace corresponds to the spring pack trace which corresponds to actual stem load. As a result of the correlation, the stem load trace 13 is also a spring pack movement race 13 and also a control post rotation trace 13 and these will be used interchangeably in subsequently describing the invention. The current measuring device 11 measured the current required by the operator motor to deliver the stem load and, therefore, the current-time trace 12 is also a record of the valve stem load-time relationship. In addition, the torque/limit switch indicating device 18 provides a switch position indication for the torque and limit switches 32 and 33, therefore the torque/limit switch position-time trace 19 provides a direct indication of the torque and limit switch timing relationship. Most important is that the torque and limit switch "off" indication can be compared to the stem load trace 13 to establish the additional stem loads delivered to the stem by the inertia of the motor and operator 16, after the torque and limit switches 32 and 33, have interrupted the current to the motor. It is recognized that the stem load trace 13 is a direct record of the dynamic valve stem load during the valve operator cycle, and therefore provides confirmation of the actual load imposed on the valve stem 5. If the recorded stem load is less than, or greater than, that required for proper valve operation, the traces 12, 13 and 19, are compared and the comparisons are used to readjust the torque switch 32 and/or limit switch 33 settings, and therefore the stem load, to within required limits.

Further, a control post rotation (spring pack movement) or stem load trace 13, current trace 12, and switch position trace 19, generated from a properly functioning valve and operator combination, can be used as a data base for comparison of subsequent control post rotation, current and switch position indication traces for purposes of verification of performance, or as a means of detecting improper functioning components of the valve 15 and operator 16.

In preferred embodiments, the process of comparison and analysis of the data is accomplished through the use of computer data bases and specialized programs which calculate and compare critical valve 15 and operator 16 parameters. This historical comparison identifies to the user a slowly degrading condition, which heretofore could not be readily detected between sequential test frequencies.

Typical valve and operator parameters which are determined and compared from the dynamic traces 12, 13, and 19 are as follows:

A. Stem load versus control post rotation (which relates to spring pack 7 deflection). Correlation of these two parameters provides the user with a known stem load for a given, subsequently obtained, control post rotation.
B. Valve packing load changes.
C. Starting stem load to initially move the valve from its closed or open position, commonly known in the state-of-the art as hammer blow.
D. Total stem load, which is the final observed stem load at the end of a given valve cycle.
E. Available stem load to seat a valve. This load is the difference between the packing load and the load at control switch trip.
F. Stem load at which the torque or limit switches actuate.
G. Total time for the valve to open or close.
H. General condition of the operator mechanical gearing and stem, by analysis of the valve mid-cycle stem load trace 13.
I. Average motor current requirements, which if it changes, can provide an indication of degrading valve performance.

This provides information of the over-all operational set-up of a valve and operator control circuitry.

An example of a computer program, which is part of the invention to perform the above analytical manipulations, is shown following:

This is an example computer program for analysis of motor operated valve control post 54 rotation (spring pack 7 movement), motor current (at current measuring device 11) and torque/limit switch 32 and 33 activation. This program is written for the Norland 3000 DMX computer.

Program listing:
1. Display B C C'D E'RO DPLY
2. O>B
3. O>C
4. O>C'
5. O>D
6. O>E'
7. O>RO
8. PAUS
9. PAUS
10. O IF>RI
11. D DISK 101
12. D DISK 102
13. D DISK 103
14. D DISK 104
15. D DISK 105
16. D DISK 106
17. D DISK 107
18. D DISK 108
19. D DISK 109
20. D DISK 110
21. D DISK 111
22. D DISK 112
23. D DISK 113
24. D DISK 114
25. END
26. PAUS
27. PAUS
28. DPLY A>DISK 104
29. DISK 104 LBL DATE LBL
30. DPLY A'>DISK 105
31. DISK 105 LBL TIME LBL
32. DPLY D'>DISK 111
33. DISK 111 LBL LOAD CONV LBL
34. PAUS
35. PAUS
36. DPLY Q1>DISK 101
37. DISK 101 LBL Q1 CURVE LBL
38. DPLY Q2>DISK 102
39. DISK 102 LBL Q2 CURVE LBL
40. DPLY Q3>DISK 103
41. DISK 103 LBL Q2 CURVE LBL
42. PAUS
43. PAUS
44. RMS>C'
45. COOR
46. C'>R8
47. O IF>V
48. O IF>V'
49. C'X−1>C'
50. GOTO 61
51. END
52. GOTO 119
53. END
54. O IF>V'
55. O IF>V
56. C'X−>C'
57. GOTO 61
58. END
59. GOTO 119
60. END
61. PAUS
62. PAUS
63. COOR 64. $H'-H>D$
65. PAUS
66. PAUS
67. COOR
68. $C'-V>E$
69. $E\times D'>E$
70. PAUS
71. PAUS
72. COOR
73. $V'-V>C$
74. $C\times D'>C$
75. PAUS
76. PAUS
77. $RMS>B'$
78. $B'>R9$
79. COOR
80. O IF>V
81. O IF>V'
82. $B'\times -1>B'$
83. GOTO 94
84. END
85. GOTO 119
86. END
87. O IF>V'
88. O IF>V
89. $B'\times -1>B'$
90. GOTO 94
91. END
92. GOTO 119
93. END
94. $B'\times D'>B$
95. $R9-R8>RO$
96. $RO\times D'>RO$
97. PAUS
98. PAUS
99. COOR
100. $C'-V>E'$
101. $E'\times D'>E'$
102. $C'\times D'>C'$
103. DPLY B>DISK 106
104. DISK 106 LABL RUNNG UBS LABL
105. DPLY B'>DISK 107
106. DISK 107 LABL RUNNG V LABL
107. DPLY C>DISK 108
108. DISK 108 LABL AVA THRST LABL
109. DPLY C'>DISK 109
110. DISK 109 LABL PRE HB RMS LABL
111. DPLY D>DISK 110
112. DISK 110 LABL TIME O/C LABL
113. DPLY E>DISK 112
114. DISK 112 LABL PKHB/RMS LABL
115. DPLY E'>DISK 113
116. DISK 113 LABL TTL THRST LABL
117. DPLY RO>DISK 114
118. DISK 114 LABL DKNG LD LABL
119. END Although only the preferred embodiment of the invention has been described, it is evident that the invention will find uses other than electric motor operated valves. For example, the invention is useful for verifying correct operation of manual, hydraulic, and pneumatic actuated valves.

Whereas, this invention has been described in detail with particular reference to preferred embodiments thereof, it will be understood that variations and modifications can be effected within the spirit and scope of the invention, as described before and as defined in the appended claims.

What is claimed is:

1. In combination, a valve operation, wherein said valve operator includes a driven worm shaft, which in turn drives a worm which in turn drives a worm gear which in turn drives a valve stem to open and close a valve attached to the valve stem, wherein said worm develops axial movement in response to a load acting on said valve stem, a spring pack provided at one end of said worm shaft for compression by axial movement of said worm, axial movement of the worm being thereby related to spring pack movement, a rack movable with said worm as it compresses said spring pack, a gear member driven by said rack, and a post member protruding from said gear member for rotation about a central longitudinal axis thereof as said gear member is driven by said rack; means for detecting the rotational movement of said post member; means for measuring said detected rotational movement of said post member; and means for correlating said detected rotational movement of said post member with the load on said valve stem.

2. In combination, a valve operator, wherein said valve operator includes a driven worm shaft, which in turn drives a worm, which in turn drives a worm gear which in turn drives a valve stem to open and close a valve attached to the valve stem, wherein said worm develops axial movement in response to a load acting on said valve stem, a spring pack provided at one end of said worm shaft for compression by axial movement of said worm, axial movement of the worm being thereby related to the spring pack movement, a rack movable with said worm as it compresses said spring pack, a gear member driven by said rack, and a post member protruding from said gear member for rotation about a central longitudinal axis thereof as said gear member is driven by said rack; means for detecting the rotational movement of said post member; means for measuring said detected rotational movement of said post member; and means for providing a time related trace of the movement of said post member.

* * * * *